US007529658B2

(12) United States Patent
Bulusu et al.

(10) Patent No.: US 7,529,658 B2
(45) Date of Patent: May 5, 2009

(54) METHOD FOR SPECIFYING EQUIVALENCE OF LANGUAGE GRAMMARS AND AUTOMATICALLY TRANSLATING SENTENCES IN ONE LANGUAGE TO SENTENCES IN ANOTHER LANGUAGE IN A COMPUTER ENVIRONMENT

(75) Inventors: Gopi Kumar Bulusu, Visakhapatnam (IN); Murali Desikan, Chennai (IN); Ranga Swami Reddy Muthumula, Visakhapatnam (IN); Seethalakshmi Gopala Subramanian, Bangalore (IN)

(73) Assignee: Sankhya Technologies Private Limited, Andhra Pradesh (IN)

( * ) Notice: Subject to any disclaimer, the term of this patent is extended or adjusted under 35 U.S.C. 154(b) by 374 days.

(21) Appl. No.: 10/522,328

(22) PCT Filed: Jul. 26, 2002

(86) PCT No.: PCT/IN02/00159

§ 371 (c)(1),
(2), (4) Date: Jan. 25, 2005

(87) PCT Pub. No.: WO2004/012028

PCT Pub. Date: Feb. 5, 2004

(65) Prior Publication Data

US 2005/0256699 A1      Nov. 17, 2005

(51) Int. Cl.
*G06F 15/00*     (2006.01)
*G06F 17/27*     (2006.01)
(52) U.S. Cl. .............................. 704/200; 704/9; 704/10; 709/227; 717/143; 717/124; 714/38; 382/161
(58) Field of Classification Search ................. 704/9, 704/10; 717/143
See application file for complete search history.

(56) References Cited

U.S. PATENT DOCUMENTS

| | | | | |
|---|---|---|---|---|
| 4,599,691 A * | 7/1986 | Sakaki et al. | ................... | 704/2 |
| 4,984,178 A * | 1/1991 | Hemphill et al. | ............ | 704/255 |
| 5,317,647 A * | 5/1994 | Pagallo | ........................ | 382/161 |
| 5,487,147 A * | 1/1996 | Brisson | .......................... | 714/1 |
| 5,581,696 A * | 12/1996 | Kolawa et al. | ................. | 714/38 |
| 5,642,519 A * | 6/1997 | Martin | .......................... | 704/9 |
| 5,754,860 A * | 5/1998 | McKeeman et al. | ......... | 717/124 |
| 5,963,742 A * | 10/1999 | Williams | ..................... | 717/143 |
| 6,016,467 A * | 1/2000 | Newsted et al. | ................. | 704/9 |
| 6,223,150 B1 * | 4/2001 | Duan et al. | ..................... | 704/9 |
| 6,233,545 B1 * | 5/2001 | Datig | ............................. | 704/2 |
| 6,278,967 B1 * | 8/2001 | Akers et al. | .................... | 704/2 |
| 6,463,404 B1 | 10/2002 | Appleby | | |
| 7,027,977 B2 * | 4/2006 | Moore | ......................... | 704/10 |

(Continued)

OTHER PUBLICATIONS

International Search Report mailed on Oct. 22, 2004.

*Primary Examiner*—Richemond Dorvil
*Assistant Examiner*—Michael C Colucci
(74) *Attorney, Agent, or Firm*—Rader, Fishman & Grauer, PLLC

(57) ABSTRACT

A method for specifying equivalence of language grammars and automatically translating sentences in one language to sentences in another language in a computer environment. The method uses a unified grammar specification of grammars of different languages in a single unified representation of all the individual grammars where equivalent production rules of each of the grammars are merged into a single unified production rule. This method can be used to represent the equivalence of computer languages like high level language, assembly language and machine language and for translating sentences in any of these languages to another language.

4 Claims, 6 Drawing Sheets

U.S. PATENT DOCUMENTS

2002/0138819 A1* 9/2002 Hills .......................... 717/114
2003/0050772 A1* 3/2003 Bennett ........................ 704/9
2004/0172234 A1* 9/2004 Dapp et al. .................... 704/1
2007/0043871 A1* 2/2007 Sweedler et al. ............ 709/227

* cited by examiner

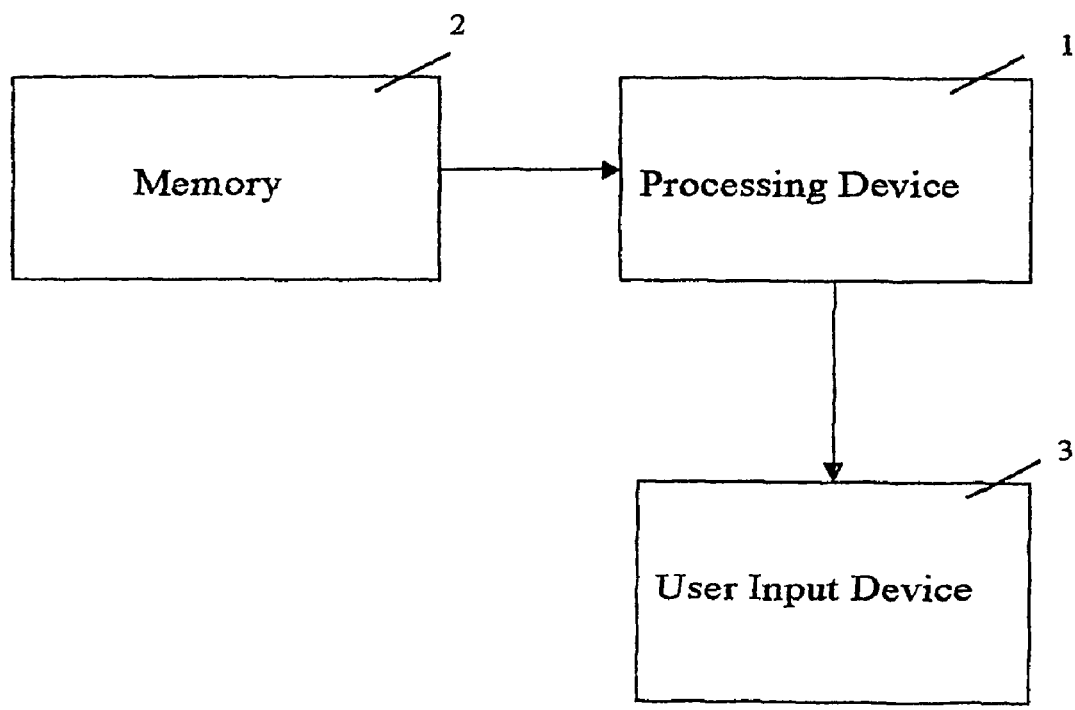
Figure I

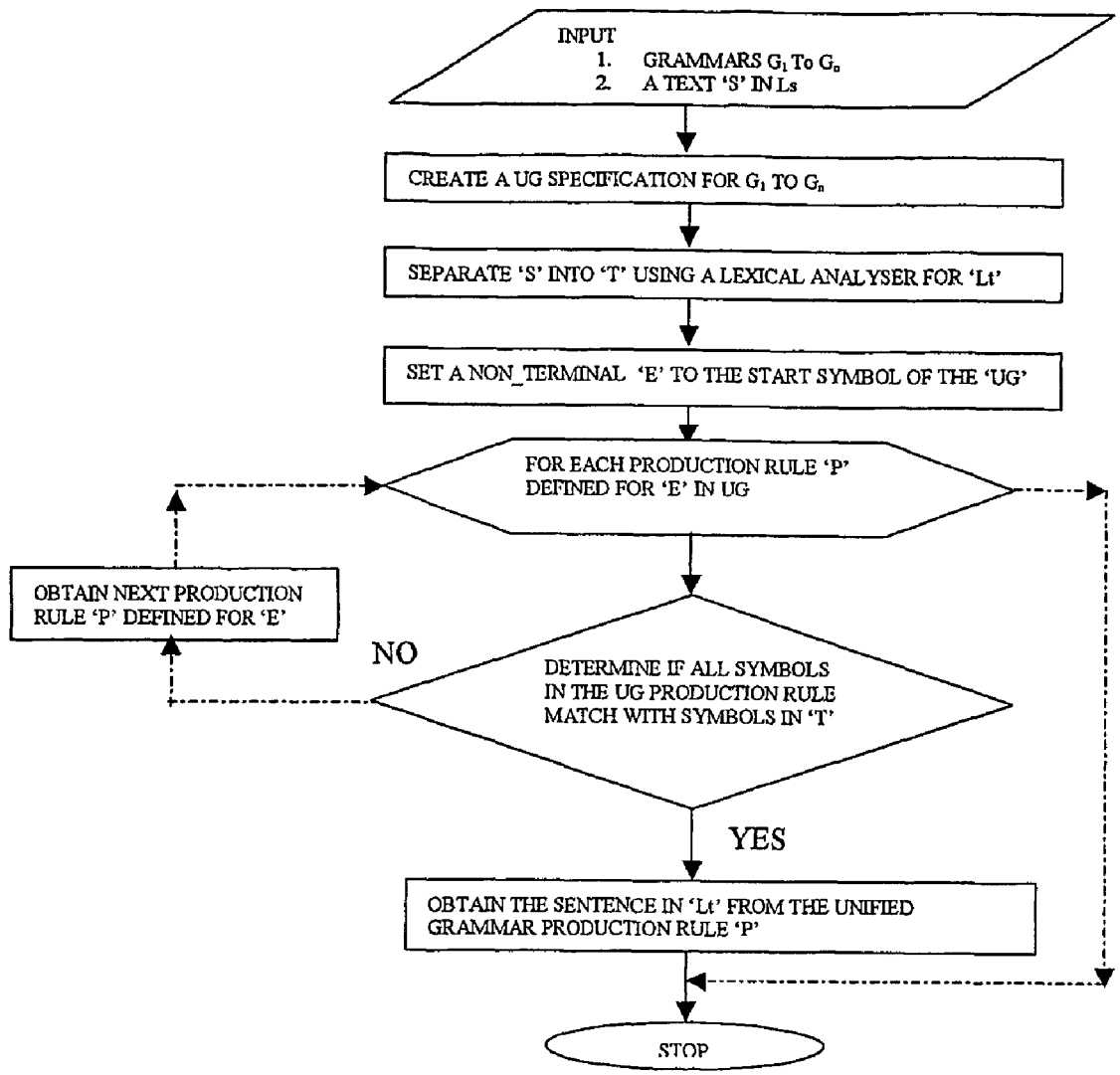
Figure-II

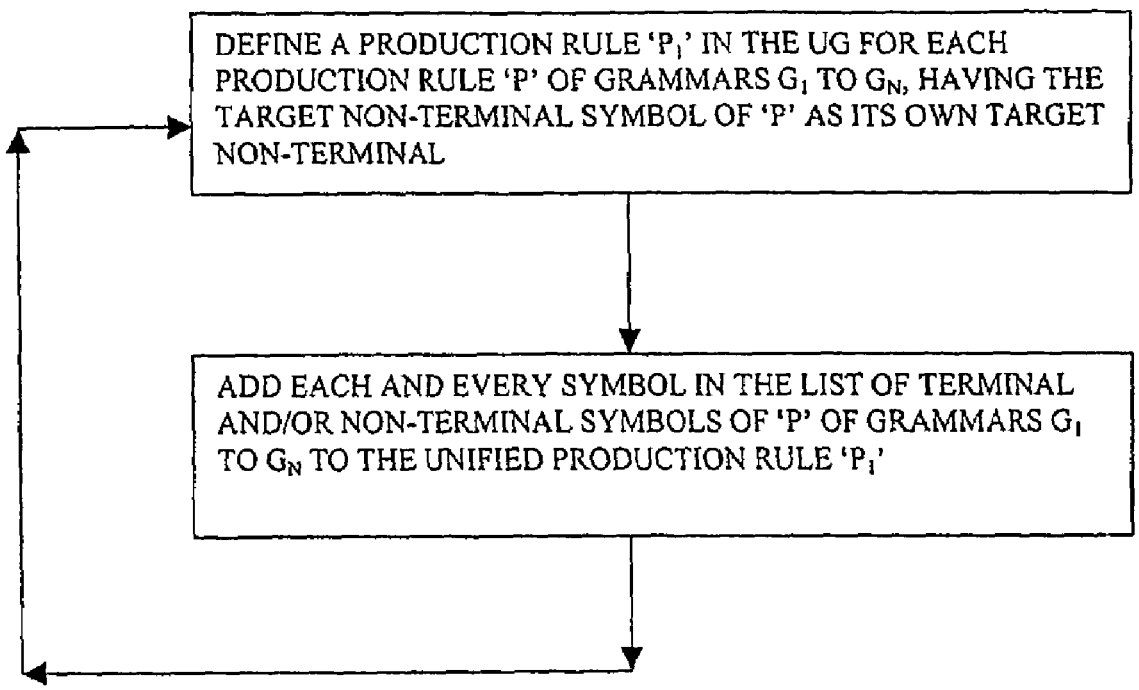
Figure III

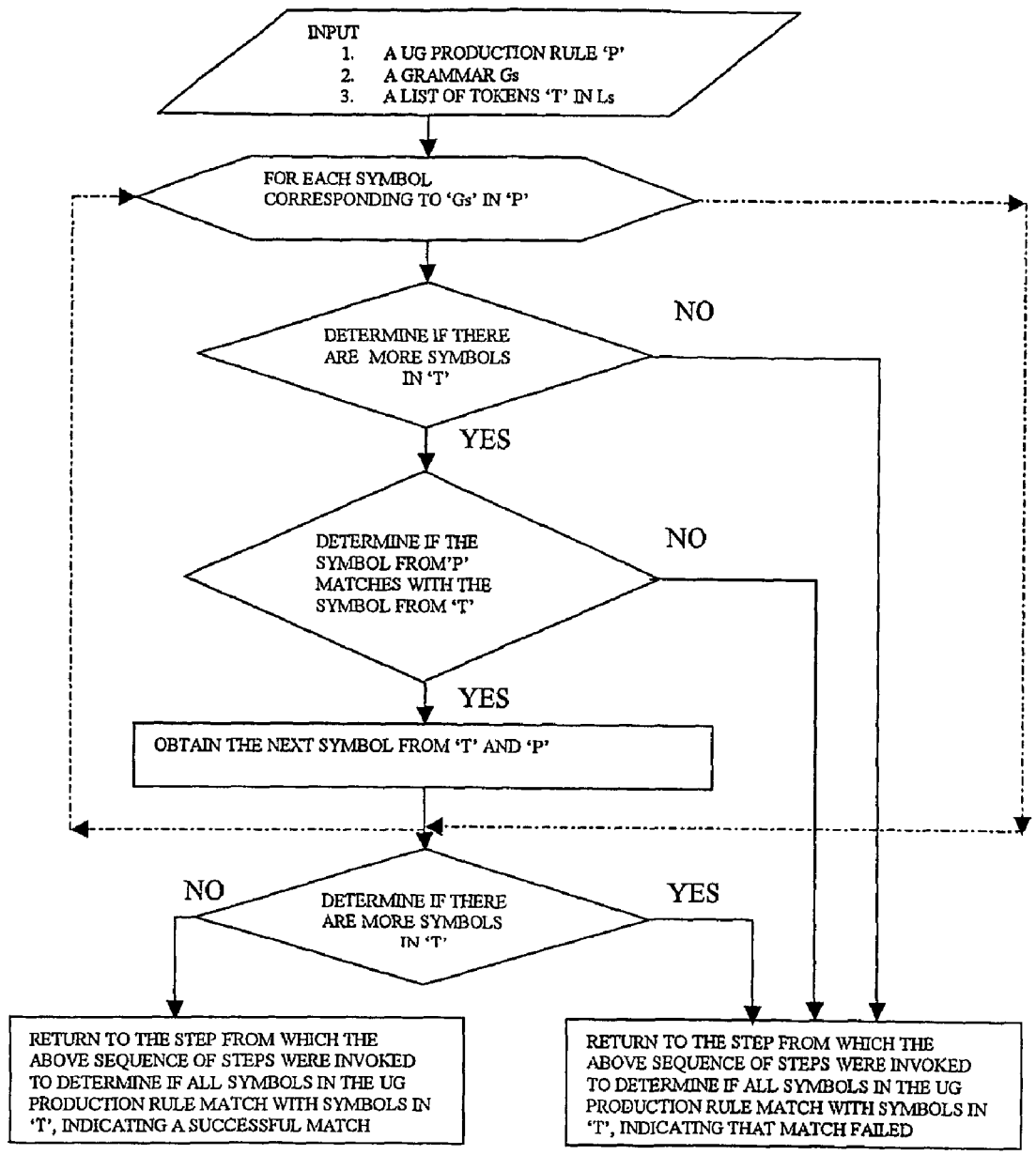
Figure IV

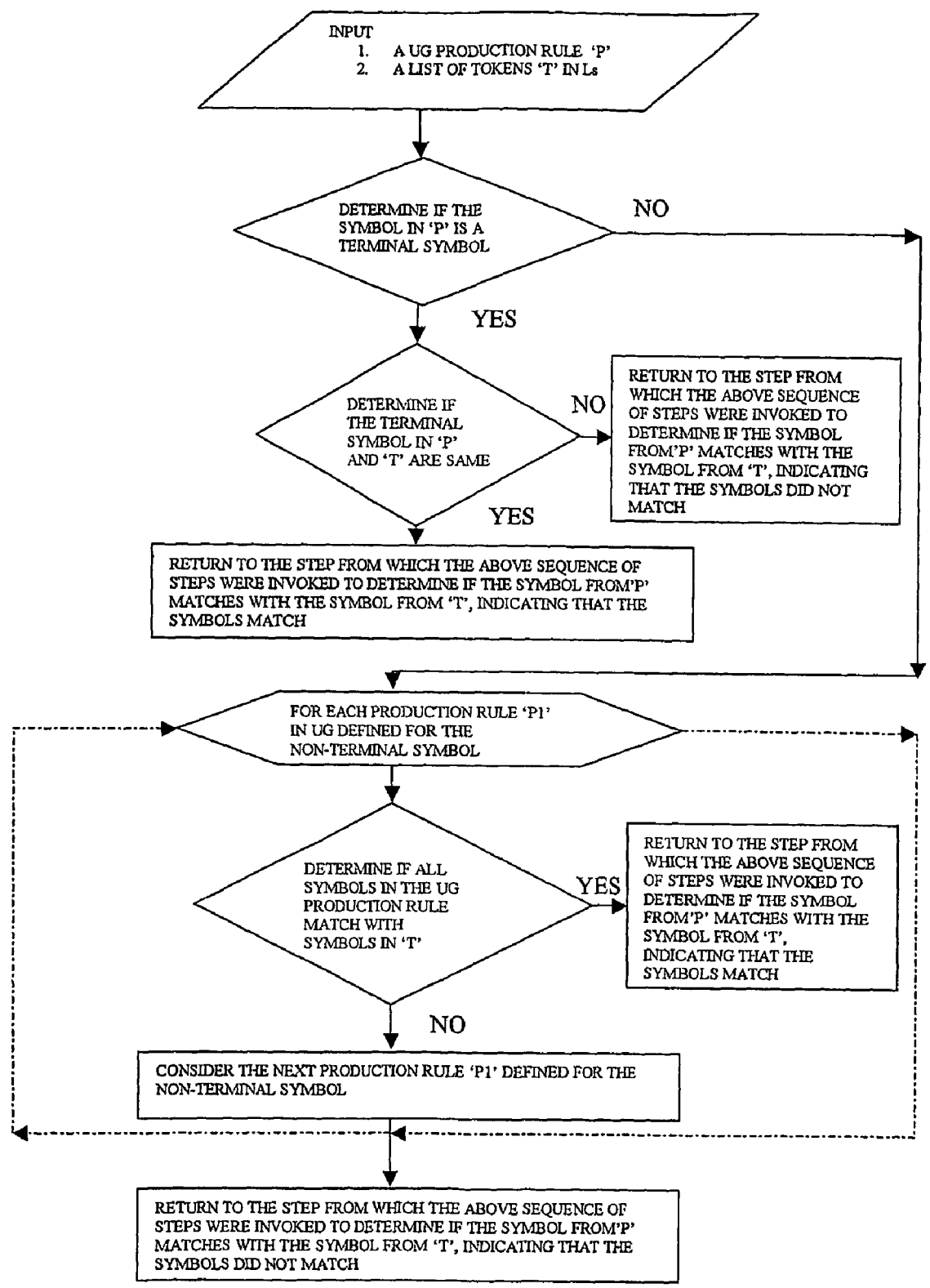
Figure - V

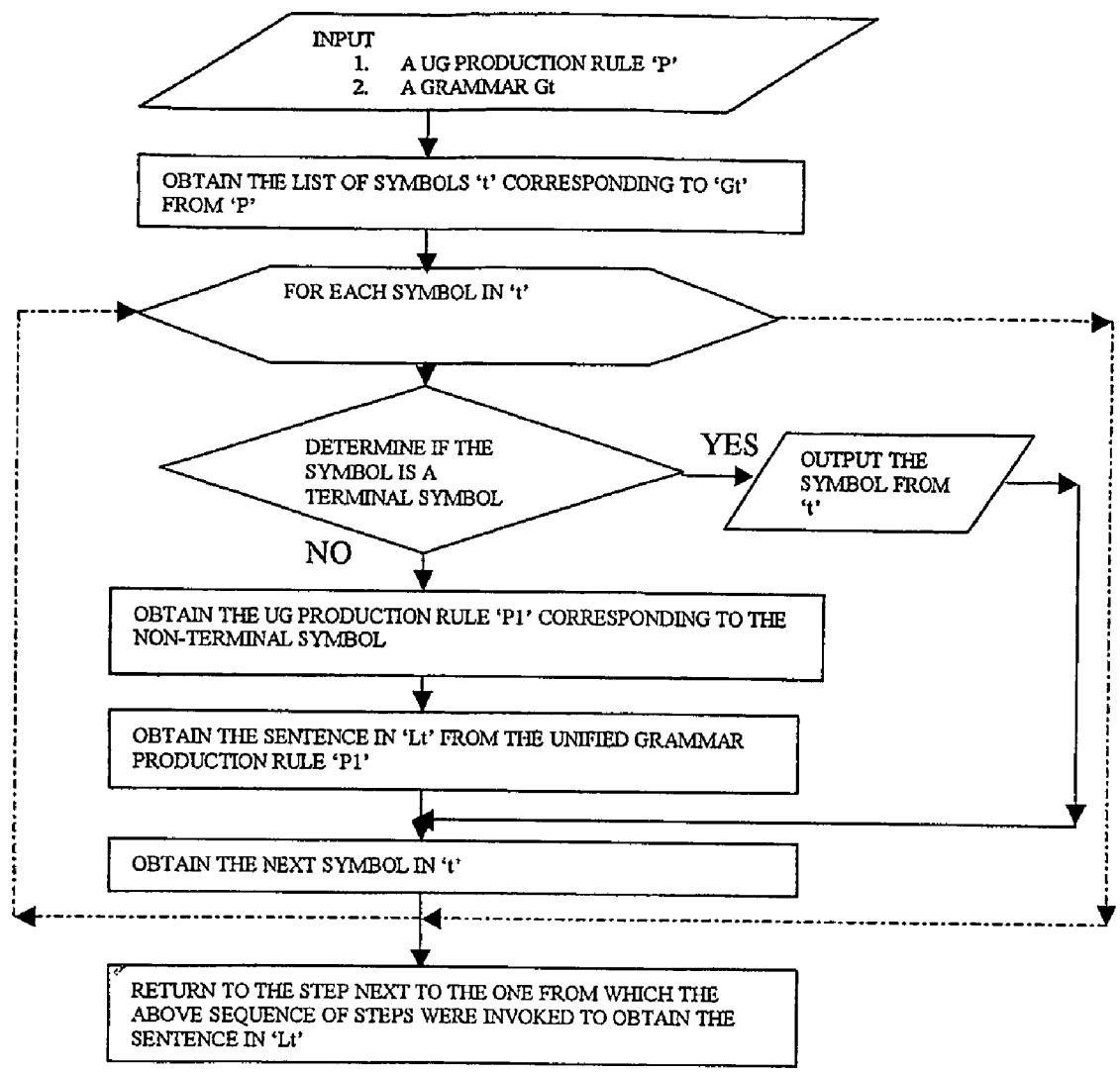
Figure- VI

METHOD FOR SPECIFYING EQUIVALENCE OF LANGUAGE GRAMMARS AND AUTOMATICALLY TRANSLATING SENTENCES IN ONE LANGUAGE TO SENTENCES IN ANOTHER LANGUAGE IN A COMPUTER ENVIRONMENT

FIELD OF INVENTION

Tile invention relates to a method for specifying equivalence of language grammars and the automatic translation of sentences in one language to sentences in another language in a computer environment.

BACKGROUND OF THE INVENTION

A language is basically a set of sentences that can be formed by following certain rules. The basic building block of any language is its alphabet. There are numerous languages existing today in the same way. The sentences are a collection of words that are formed from the letters of the alphabet. There are certain rules to be followed when putting these words together. These rules are called grammar of the language and are unique for each and every language. These rules determine the valid sentences of the language. Thus one can define grammar as a concise specification using which, it is possible to generate all the valid sentences of the language. A grammar specifies the syntax or structure of a language; irrespective of whether it is a language such as English or programming language such as 'C' or assembly language.

Very often, it is required to convert sentences in one language to equivalent sentences in another language. For example from English to French or from a programming language to assembly language. To perform such tasks the language grammars have to be specified and the source language statements should be validated and translated to sentences in the target language.

A method used in the prior art for translating a language to another language used is carried out in the following manner.

Define the source language grammar. Parse the sentences and convert them to a predefined intermediate format and translate finally, the intermediate format to the target language.

The disadvantages in performing a translation by the above mentioned method are the following (i) This method will not allow equivalence of the source language grammar and target language grammar to be specified. Thus there is no real correspondence between source language grammar and target language grammar.
(ii) Normally this method allows the translation from one source language to one target language only. Mapping to multiple target languages will not be possible.
(iii) Mapping from a source language to a target language is predefined and thus supporting translations to new languages will be difficult.

OBJECT OF THE INVENTION

Bearing in mind the problems and detriments of the prior art, the object of the present invention is to provide a method to automatically translate sentences from one language to another, overcoming the above mentioned deficiencies.

Thus one of the object of the present invention is to be able to specify the equivalence of the source language grammar and target language grammar.

Another object of the present invention is to allow mapping to multiple target languages. Method according to the invention should have no restrictions to translating a source language to more than one target languages.

DESCRIPTION OF THE INVENTION

The invention provides a method for representing equivalence of language grammars and for the automatic translation of sentences in one language to sentences in another language in a computer environment.

Let $L_1$ to $L_n$ be n number of languages and $G_1$ to $G_n$ represent the respective grammars for the languages $L_1$ to $L_n$. Each grammar is unique to that particular language. Each grammar $G_1$ to $G_n$ consists of a set of terminal symbols, a set of nonterminal symbols, a unique start symbol which is a nonterminal symbol and a set of production rules. These production rules are the main aspects of the grammar. Production rule define the rules to reduce a string of terminal and/or nonterminal symbols to a target nonterminal symbol.

In a grammar, there is at least one production rule that has the start symbol as its target nonterminal symbol. A sentence of a language may be defined as ally string derived from the start symbol composed of only terminal symbols.

In the method according to the invention a unified grammar specification is created for the grammars $G_1$ to $G_n$ of all the languages $L_1$ to $L_n$ respectively. Then the text in the source language is separated into a list of tokens using conventional lexical analyser for the source language. A nonterminal symbol is set to the start symbol of the unified grammar specification. Then a set of grammar production rules is obtained for the said non-terminal symbol form the unified grammar specifications. Take each symbol one by one from a list of terminal symbols and/or nonterminal symbols corresponding to the source language grammar, determine whether it is a terminal symbol or a nonterminal symbol. For each terminal symbol obtained which is equivalent to a corresponding symbol in the list of tokens form the source language, consider the next symbol in the list of said terminal symbols and/or nonterminal symbols. For each nonterminal symbol obtained which refers to another non-terminal symbol obtain a set of grammar production rules for that nonterminal symbol and repeat the previous steps.

If all the symbols in the said list of terminal symbols and/or non-terminal symbols corresponding to the source language grammar match with symbols in the said list of tokens of the input text obtain a list of symbols corresponding to the target language grammar from the said unified grammar production rule. For those symbols in the said list of terminal symbols and/or non-terminal symbols which do not match with symbols in the said list of tokens, repeat the earlier steps considering the next production rule from the set of production rules obtained for the non-terminal.

Taking each symbol one by one from the said list of symbols corresponding to the target language grammar, determine whether it is a terminal symbol or non-terminal symbol. Each terminal symbol obtained are provided as output. For each nonterminal symbol, obtain another unified grammar production rule corresponding to that nonterminal symbol and repeat this step till all the symbols in the said list of symbols corresponding to the target language grammar are exhausted.

BRIEF DESCRIPTION OF DRAWINGS

FIG. I shows a system with which the method according to the invention can be implemented.

FIG. II shows the flow chart of the method according to the invention.

FIG. III shows the steps taken to create the unified grammar specification in the second step shown in FIG. II.

FIG. IV shows the steps taken to determine if all symbols in a unified grammar production rule match with the symbols in the token list 'T' in the sixth step of FIG. II and the seventh step of FIG. V.

FIG. V shows the steps taken to determine if a symbol from a unified grammar production rule matches with a symbol from the token list 'T' in the fourth step of FIG. IV.

FIG. VI shows the steps taken to obtain the sentence '$L_t$' from a unified grammar production rule 'P' in the eight step of FIG. II and in the seventh step of FIG. VI.

DESCRIPTION WITH REFERENCE TO THE DRAWINGS

The method according to the invention can be implemented by using a processing device (1) such as a microprocessor, a memory (2) and a user input device (3) connected to said processor (1). The user-input device may be a keyboard or any other device which can provide information signals to the processor. The memory typically consists of a RAM and a ROM. According to the invention, the method of automatic translation of a sentences from a source language $L_s$ selected from a number of languages $L_1$ to $L_n$ to a target language $L_t$ selected from the number of languages $L_1$ to $L_n$ comprises the following steps.

Step 1: Grammars $G_1$ to $G_n$ of all the languages $L_1$ to $L_n$ respectively and a text 'S' in the source language $L_s$, are provided as inputs.

Step 2: A unified grammar specification UG is created for the grammars $G_1$ to $G_n$.

Step 3: The input text 'S' in the source language $L_s$ is separated into a list of tokens T using a lexical analyser for the source language $L_s$.

Step 4: A nonterminal symbol 'E' is set to the start symbol of the unified grammar specification UG.

Step 5: A set of grammar production rules $P_e$ is obtained by selecting the production rules which contain 'E' as their target non-terminal symbol from the unified grammar specification UG.

Step 6: For each unified grammar production rule P in the set of grammar production rules $P_e$ taking each symbol one by one from a list of terminal symbols and/or non-terminal symbols corresponding to the source language grammar $G_s$, determine whether it is a terminal symbol or a non-terminal symbol.

Step 7: For each terminal symbol obtained from the previous step which is equivalent to a corresponding symbol in the list of tokens T of the input text in the source language $L_s$, consider the next symbol in said list of terminal symbols and/or nonterminal symbols corresponding to the source language grammar $G_s$ and for each nonterminal symbol obtained from the previous step which refers to another nonterminal symbol $E_s$, of the unified grammar specification UG, repeat step (5) onwards with the new nonterminal $E_s$.

Step 8: If all the symbols in the said list of terminal symbols and/or non-terminal symbols corresponding to the source language grammar $G_s$ match with all the symbols in the list of tokens T of the input text in the source language $L_s$, obtain a list of symbols t corresponding to the target language grammar $G_t$ from the unified grammar production rule P and for those symbols which do not match, repeat step 6 onwards for the next unified grammar production rule P defined for the nonterminal symbol 'E'.

Step 9: Take each symbol one by one, from the list of symbols t corresponding to the target grammar $G_t$ and determine whether it is a terminal symbol or a non-terminal symbol.

Step 10: For each terminal symbol obtained from the previous step output the symbol, and consider the next symbol and for each nonterminal symbol obtained from the previous step, obtain another unified grammar production rule P corresponding to that nonterminal symbol and repeat the previous step with the new unified grammar production rule, till all the symbols in the list of symbols t corresponding to the target language grammar $G_t$ are exhausted.

The unified grammar specification UG, for the grammars $G_1$ to $G_n$ of languages $L_1$ to $L_n$, is created by defining a unified production rule $P_1$ in the unified grammar specification UG having the target nonterminal symbol of the production rule P as its target nonterminal symbol for every production rule P of the grammars $G_1$ to $G_n$ and creating a list of terminal symbols and/or nonterminal symbols in the said production rule $P_1$ for each grammar $G_1$ to $G_n$; adding each and every symbol in the list of terminal and/or nonterminal symbols that are represented by the target nonterminal symbol in the production rule P to the said unified production rule $P_1$ and repeating previous steps for the next production rule of the grammars $G_1$ to $G_n$.

The method according to the invention can be used to represent the equivalence of multiple language grammars and for translating sentences of one language to another.

The invention claimed is:

1. A method of automatic translation of sentences from a source language $L_s$ selected from language $L_1$ to $L_n$ to a target language $L_t$ selected from languages $L_1$ to $L_n$, in which steps thereof are implemented by a computer, comprising the steps of:

(i) providing grammars $G_1$ to $G_n$ of all the languages $L_1$ to $L_n$ respectively, in which each grammar is unique to that particular language, and a text 'S' in the source language $L_s$ as inputs;

(ii) creating a unified grammar specification UG for the grammars $G_1$ to $G_n$, in which equivalent grammar production rules of each grammar $G_1$ to $G_n$ are combined into a single unified production rule;

(iii) separating the input text 'S' in the source language $L_s$ into a list of tokens using a lexical analyser for the source language $L_s$;

(iv) setting a current non-terminal symbol to the start symbol of the unified grammar specification UG;

(v) obtaining a set of the grammar production rules from the united grammar specification UG, which contain the current non-terminal symbol as their target non-terminal;

(vi) for each unified grammar production rule P in the set of the grammar production rules obtained from the previous step (v), taking each symbol one by one from a list of terminal symbols and/or non-terminal symbols corresponding to the source language grammar $G_s$, determining whether it is a terminal symbol or a non-terminal symbol;

(vii) for each terminal symbol obtained from the previous step, which is equivalent to a corresponding symbol in the list of tokens T of the input text in the source language $L_s$, considering the next symbol in said list of terminal symbols and/or non-terminal symbols corresponding to the source language grammar $G_s$ and for each non-terminal symbol $E_s$ obtained from the previous step, repeating step (v) onwards with $E_s$ as the current non-terminal symbol;

(viii) if all the symbols in the said list of terminal symbols and/or non-terminal symbols corresponding to the source language grammar $G_s$ match with all the symbols in the list of tokens T of the input text in the source language $L_s$, obtaining a list of symbols t corresponding to the target language grammar $G_t$ from the unified grammar production rule P and for those symbols which do not match, repeating step (vi) onwards for a next unified grammar production rule P defined for the non-terminal symbol 'E';

(ix) taking each symbol one by one, from the list of symbols t corresponding to the target grammar $G_t$ and determining whether it is a terminal symbol or a non-terminal symbol;

(x) for each terminal symbol obtained from the previous step outputting the symbol, and considering the next symbol and for each non-terminal obtained from the previous step, obtaining another unified grammar production rule P corresponding to that non-terminal symbol and repeating the previous step with the new unified grammar production rule, till all the symbols in the list of symbols t corresponding to the target language grammar $G_t$ are exhausted.

2. The method as claimed in claim 1, wherein the unified grammar specification UG, for the grammars $G_1$ to $G_n$, of languages $L_1$ to $L_n$, is created by the steps of:

(i) for every production rule P of the grammars $G_1$ to $G_n$, of the languages $L_1$ to $L_n$, defining a unified production rule $P_1$ in the unified grammar specification UG having the target non-terminal symbol of the production rule P as its target non-terminal symbol; and (ii) for each grammar $G_1$ to $G_n$ creating a list of terminal symbols and/or non-terminal symbols in the said production rule $P_1$ and adding each and every symbol in the list of terminal symbols and/or non-terminal symbols that are represented by the target non-terminal symbol in the production rule P to the said unified production rule $P_1$ and repeating previous step for the next production rule of the grammars $G_1$ to $G_n$.

3. An apparatus for automatic translation of sentences from a source language $L_s$ selected from language $L_1$ to $L_n$ to a target language $L_t$ selected from languages $L_1$ to $L_n$ comprising:

(i) means for providing grammars $G_1$ to $G_n$ of all the languages $L_1$ to $L_n$ respectively, in which each grammar is unique to that particular language, and a text 'S' in the source language $L_s$ as inputs;

(ii) means for creating a unified grammar specification UG for the grammars $G_1$ to $G_n$, in which equivalent grammar production rules of each grammar $G_1$ to $G_n$ are combined into a single unified production rule;

(iii) means for separating the input text 'S' in the source language $L_s$ into a list of tokens using a lexical analyser for the source language $L_s$;

(iv) means for setting a current non-terminal symbol to the start symbol of the unified grammar specification UG;

(v) grammar production rule obtaining means for obtaining a set of the grammar production rules from the united grammar specification UG, which contain the current non-terminal symbol as their target non-terminal;

(vi) for each unified grammar production rule P in the set of the grammar production rules obtained from the grammar production rule obtaining means, symbol taking means for taking each symbol one by one from a list of terminal symbols and/or non-terminal symbols corresponding to the source language grammar $G_s$, determining whether it is a terminal symbol or a non-terminal symbol;

(vii) for each terminal symbol obtained from the symbol taking means, which is equivalent to a corresponding symbol in the list of tokens T of the input text in the source language $L_s$, means for considering the next symbol in said list of terminal symbols and/or non-terminal symbols corresponding to the source language grammar $G_s$ and for each non-terminal symbol $E_s$ obtained from the symbol taking means, repeating obtaining a set of the grammar production rules from the united grammar specification UG by the grammar production rule obtaining means, onwards with $E_s$ as the current non-terminal symbol;

(viii) if all the symbols in the said list of terminal symbols and/or non-terminal symbols corresponding to the source language grammar $G_s$ match with all the symbols in the list of tokens T of the input text in the source language $L_s$, means for obtaining a list of symbols t corresponding to the target language grammar $G_t$ from the unified grammar production rule P and for those symbols which do not match, repeating taking each symbol one by one from a list of terminal symbols and/or non-terminal symbols corresponding to the source language grammar $G_s$ by the symbol taking means, onwards for a next unified grammar production rule P defined for the non-terminal symbol 'E';

(ix) determining means for taking each symbol one by one, from the list of symbols t corresponding to the target grammar $G_t$ and determining whether it is a terminal symbol or a non-terminal symbol;

(x) for each terminal symbol obtained from the determining means, means for outputting the symbol, and considering the next symbol and for each non-terminal obtained from the determining means, means for obtaining another unified grammar production rule P corresponding to that non-terminal symbol and repeating the determining means with the new unified grammar production rule, till all the symbols in the list of symbols t corresponding to the target language grammar $G_t$ are exhausted.

4. A computer readable medium for automatic translation of sentences from a source language $L_s$ selected from language $L_1$ to $L_n$ to a target language $L_t$ selected from languages $L_1$ to $L_n$, including program instructions executable by a computer system for:

(i) providing grammars $G_1$ to $G_n$ of all the languages $L_1$ to $L_n$ respectively, in which each grammar is unique to that particular language, and a text 'S' in the source language $L_s$ as inputs;

(ii) creating a unified grammar specification UG for the grammars $G_1$ to $G_n$, in which equivalent grammar production rules of each grammar $G_1$ to $G_n$ are combined into a single unified production rule;

(iii) separating the input text 'S' in the source language $L_s$ into a list of tokens using a lexical analyser for the source language $L_s$;

(iv) setting a current non-terminal symbol to the start symbol of the unified grammar specification UG;

(v) obtaining a set of the grammar production rules from the united grammar specification UG, which contain the current non-terminal symbol as their target non-terminal;

(vi) for each unified grammar production rule P in the set of the grammar production rules obtained from the previous step (v), taking each symbol one by one from a list of terminal symbols and/or non-terminal symbols corresponding to the source language grammar $G_s$, determining whether it is a terminal symbol or a non-terminal symbol;

(vii) for each terminal symbol obtained from the previous step, which is equivalent to a corresponding symbol in the list of tokens T of the input text in the source language $L_s$, considering the next symbol in said list of terminal symbols and/or non-terminal symbols corresponding to the source language grammar $G_s$ and for each non-terminal symbol $E_s$ obtained from the previous step, repeating step (v) onwards with $E_s$ as the current non-terminal symbol;

(viii) if all the symbols in the said list of terminal symbols and/or non-terminal symbols corresponding to the source language grammar $G_s$ match with all the symbols in the list of tokens T of the input text in the source language $L_s$, obtaining a list of symbols t corresponding to the target language grammar $G_t$ from the unified grammar production rule P and for those symbols which do not match, repeating step (vi) onwards for a next unified grammar production rule P defined for the non-terminal symbol 'E';

(ix) taking each symbol one by one, from the list of symbols t corresponding to the target grammar $G_t$ and determining whether it is a terminal symbol or a non-terminal symbol;

(x) for each terminal symbol obtained from the previous step outputting the symbol, and considering the next symbol and for each non-terminal obtained from the previous step, obtaining another unified grammar production rule P corresponding to that non-terminal symbol and repeating the previous step with the new unified grammar production rule, till all the symbols in the list of symbols t corresponding to the target language grammar $G_t$ are exhausted.

* * * * *